(12) United States Patent
Hayashida et al.

(10) Patent No.: US 11,091,873 B2
(45) Date of Patent: Aug. 17, 2021

(54) CLOTH SPREADING APPARATUS

(71) Applicant: PUREX CO., LTD., Takamatsu (JP)

(72) Inventors: Yoo Hayashida, Takamatsu (JP); Hiroyuki Ideue, Takamatsu (JP)

(73) Assignee: PUREX CO., LTD., Takamatsu (JP)

( * ) Notice: Subject to any disclaimer, the term of this patent is extended or adjusted under 35 U.S.C. 154(b) by 126 days.

(21) Appl. No.: 16/619,422

(22) PCT Filed: Jun. 4, 2018

(86) PCT No.: PCT/JP2018/021324
§ 371 (c)(1),
(2) Date: Dec. 4, 2019

(87) PCT Pub. No.: WO2018/225669
PCT Pub. Date: Dec. 13, 2018

(65) Prior Publication Data
US 2020/0173097 A1    Jun. 4, 2020

(30) Foreign Application Priority Data
Jun. 6, 2017    (JP) .............................. JP2017-111607

(51) Int. Cl.
*D06F 67/04*    (2006.01)
*B65G 47/04*    (2006.01)
*D06C 3/00*    (2006.01)

(52) U.S. Cl.
CPC ............. *D06F 67/04* (2013.01); *B65G 47/04* (2013.01); *D06C 3/00* (2013.01)

(58) Field of Classification Search
CPC .......... D06F 67/04; D06F 67/00; D06F 67/10; B65G 47/04; B65G 47/52; B65G 47/74; D06C 3/00
See application file for complete search history.

(56) References Cited

U.S. PATENT DOCUMENTS 3,431,665 A * 3/1969 Weir ..................... D06C 3/00
                                                              38/143
3,729,846 A    5/1973 Weir
(Continued)

FOREIGN PATENT DOCUMENTS

CN    102190175 A    9/2011
CN    202543615 U    11/2012
(Continued)

OTHER PUBLICATIONS

Feb. 22, 2021 Office Action issued in Chinese Patent Application No. 2018800375812.
(Continued)

*Primary Examiner* — Ismael Izaguirre
(74) *Attorney, Agent, or Firm* — Oliff PLC

(57) ABSTRACT

A cloth spreading apparatus has a spread the remainder of a piece of cloth to smooth out every wrinkle, without requiring a dedicated assistant worker, including: a conveyor belt receiving an upper side portion of a piece of cloth having been spread in a right-left direction, pulls the upper side portion rearward, sequentially pulls up the remainder from a middle to a lower side portion, and ejects the entire cloth rearward. Also, a wrinkle smoothing unit that smooths out wrinkles in the remainder while the conveyor belt pulls up the remainder. The wrinkle smoothing unit has a pair of wrinkle smoothing clamps that clamp right and left side portions of the remainder being pulled up by the conveyor belt, and wrinkle smoothing clamp moving mechanisms that move the clamps upward and apart from each other in the right-left direction while the cloth is pulled up by the conveyor belt.

8 Claims, 7 Drawing Sheets

(56) References Cited

U.S. PATENT DOCUMENTS

| | | | | |
|---|---|---|---|---|
| 3,736,678 | A * | 6/1973 | Kamberg | D06F 67/04 38/143 |
| 4,553,662 | A * | 11/1985 | Munch | D06F 67/04 198/456 |
| 5,333,402 | A * | 8/1994 | Weir | D06F 67/04 271/268 |
| 5,416,992 | A * | 5/1995 | Ueda | D06F 67/04 198/689.1 |
| 9,657,434 | B2 * | 5/2017 | Garrone | D06F 67/04 |
| 2009/0092464 | A1 | 4/2009 | Sielermann et al. | |
| 2011/0221124 | A1 | 9/2011 | Narikiyo | |
| 2018/0148287 | A1 | 5/2018 | Maeshima | |

FOREIGN PATENT DOCUMENTS

| | | |
|---|---|---|
| CN | 204474963 U | 7/2015 |
| CN | 204506072 U | 7/2015 |
| EP | 0 011 403 A1 | 5/1980 |
| FR | 2553119 A * | 4/1985 |
| JP | H06-36600 U | 5/1994 |
| JP | H07-54262 A | 2/1995 |
| JP | 2009-268571 A | 11/2009 |
| JP | 2011036312 A | 2/2011 |
| JP | 2013-085767 A | 5/2013 |
| JP | 5916063 B2 | 5/2016 |
| TW | I589488 B | 7/2017 |

OTHER PUBLICATIONS

Oct. 31, 2019 Taiwanese Office Action issued in Taiwanese Patent Application No. 107141155.
Sep. 4, 2018 International Search Report issued in International Patent Application No. PCT/JP2018/021324.
May 20, 2020 Extended European Search Report issued in European Patent Application No. 18813650.1.

* cited by examiner

CLOTH SPREADING APPARATUS

TECHNICAL FIELD

The present invention relates to a cloth spreading apparatus that is used in a cloth washing factory or the like to spread, one by one, washed pieces of cloth to make the cloth ready to be fed into an iron roller etc. in the next process, and more particularly relates to a cloth spreading apparatus that is suitable for spreading a so-called bed linen such as bed sheet, duvet cover, or the like having a bag shape and used to cover a bedding.

BACKGROUND ART

One example of known conventional cloth spreading apparatuses is described in Patent Literature 1 that was disclosed earlier by the present applicant. This cloth spreading apparatus includes a cloth feeding unit, a spreading unit that spreads cloth in a right-left direction, an assisting spreading unit that assists spreading of the cloth, and an ejection unit that ejects the spread cloth. Here, the feeding unit has a pair of feeding clamps that grasp adjacent corners of the cloth at a feeding position, and a raising-lowering device that moves the pair of feeding clamps upward and downward between the feeding position and a hand-over position located higher than the feeding position. The spreading unit has a pair of spreading clamps that receive the adjacent corners of the cloth from the pair of feeding clamps at the hand-over position of the feeding clamps and grasp these corners, and a lateral moving device that laterally moves the pair of spreading clamps and thereby spreads the cloth in the right-left direction. The assisting spreading unit has two sets of endless belts making a pair that face each other in a front-rear direction and extend in a horizontal direction, and that loosely hold right and left side portions of the remainder of the cloth from a middle portion to a lower side portion, having been spread in the right-left direction by the lateral moving device, between the opposite endless belts and thereby spread the remainder of the cloth in the right-left direction. The ejection unit has an intermediate moving body that receives, at a forward position, the upper side portion of the cloth having been spread in the right-left direction from the spreading clamps, and moves backward while retaining the upper side portion by suction, and a conveyor belt that receives the upper side portion of the cloth having been released from the intermediate moving body during the backward motion, pulls the upper side portion rearward, and pulls up also the remainder of the cloth from the middle portion to the lower side portion, and ejects the entire cloth rearward.

In this conventional cloth spreading apparatus, when a worker picks up adjacent corners of a washed piece of cloth and has these corners respectively grasped by the pair of feeding clamps at the feeding position, the raising-lowering device moves the pair of feeding clamps upward to the hand-over position. The pair of spreading clamps receive the adjacent corners of the cloth from the pair of feeding clamps at the hand-over position, and grasp these corners. The lateral moving device laterally moves the pair of spreading clamps in a separating direction and thereby spreads the cloth in the right-left direction. The intermediate moving body receives, at the forward position, the upper side portion of the cloth having been spread in the right-left direction from the spreading clamps, and moves backward while retaining the upper side portion by suction. The conveyor belt receives the upper side portion of the cloth having been released from the intermediate moving body during the backward motion, pulls the upper side portion rearward, sequentially pulls up also the remainder of the cloth from the middle portion to the lower side portion, and ejects the entire cloth rearward.

While the conveyor belt is pulling up the remainder of the cloth as described above, in the assisting spreading unit, the two sets of endless belts making a pair that face each other in the front-rear direction and extend in the horizontal direction hold the right and left side portions of the remainder of the cloth between the opposite endless belts loosely enough for the cloth to slide, so as to allow the conveyor belt to pull up the cloth, and spread the remainder of the cloth in the right-left direction to thereby smooth out wrinkles in the remainder of the cloth.

CITATION LIST

Patent Literature

Patent Literature 1: JP-A-2009-268571

SUMMARY OF INVENTION

Technical Problem

In the conventional cloth spreading apparatus, wrinkles are smoothed out by the assisting spreading unit holding the right and left side portions of the remainder of the cloth from the middle portion to the lower side portion loosely enough for the cloth to slide, and spreading the remainder of the cloth in the right-left direction. However, depending on the state of the cloth or the type of the cloth, for example, in the case of such a bed linen that a front piece and a back piece thereof are sewn together into a bag shape and these two sheets of cloth tend to slip over each other, the remainder of the cloth from the middle portion to the lower side being pulled up by the conveyor belt may fail to be spread enough. As a result, as shown in FIGS. 5(a) and 5(b), some wrinkles W may fail to be smoothed out and remain in a front piece FC or a back piece BC (the back piece BC in the shown example) of the part of the cloth C from the middle portion to the lower side. This is where there is still room for improvement.

The wrinkles remaining in the cloth that the assisting spreading device has failed to smooth out need to be smoothed out by a worker putting his or her hands into the cloth spreading apparatus and pulling the right and left side portions of the remainder of the cloth, which is being pulled up by the conveyor belt, in the right-left direction. Performing such wrinkle smoothing work entails problems in that the labor cost of workers increases as a dedicated assistant worker for the wrinkle smoothing work is required other than workers for feeding work, and that the assistant worker is subjected to the dangerous work.

Solution to Problem

The present invention solves the problems with the conventional cloth spreading apparatus as described above. A cloth spreading apparatus of the present invention includes:

a spreading unit having a pair of spreading clamps that grasp adjacent corners of a fed piece of cloth and spread at least an upper side portion between these corners in a right-left direction; and an ejection unit having a conveyor belt that receives the spread upper side portion of the cloth, pulls the upper side portion rearward, sequentially pulls up also the remainder of the cloth from a middle portion to a lower side portion, and ejects the entire cloth rearward, characterized in that:

the cloth spreading apparatus further includes a wrinkle smoothing unit that smooths out wrinkles in the remainder of the cloth from the middle portion to the lower side portion while the conveyor belt is pulling up the remainder of the cloth; and the wrinkle smoothing unit has:

a pair of wrinkle smoothing clamps that respectively clamp right and left side portions of the remainder of the cloth being pulled up by the conveyor belt; and a wrinkle smoothing clamp moving mechanism that moves the pair of wrinkle smoothing clamps upward and at the same time apart from each other in the right-left direction as the remainder of the cloth is pulled up by the conveyor belt.

Advantageous Effects of Invention

In the cloth spreading apparatus of the present invention, when a washed piece of cloth is fed into the apparatus by a worker etc., the pair of spreading clamps of the spreading unit grasp adjacent corners of the fed cloth and spread at least an upper side portion between these corners in the right-left direction. The conveyor belt of the ejection unit receives the spread upper side portion of the cloth, pulls the upper side portion rearward, sequentially pulls up also the remainder of the cloth from a middle portion to a lower side portion, and ejects the entire cloth rearward.

Further, in the cloth spreading apparatus of the present invention, while the conveyor belt is pulling up the remainder of the cloth, the pair of wrinkle smoothing clamps of the wrinkle smoothing unit, which are moved by the wrinkle smoothing clamp moving mechanism upward and at the same time apart from each other as the remainder of the cloth is pulled up, clamp the right and left side portions of the remainder of the cloth, pull these portions in the right-left direction, and spread the remainder of the cloth in the right-left direction to thereby smooth out wrinkles in the remainder of the cloth.

Since the wrinkle smoothing clamps thus reliably clamp the right and left side portions of the remainder of the cloth from the middle portion to the lower side portion and spread the remainder of the cloth in the right-left direction, the cloth spreading apparatus of the present invention can spread the remainder of the cloth enough to smooth out every wrinkle regardless of the state of the cloth or the type of the cloth, without requiring a dedicated assistant worker for wrinkle smoothing work. Therefore, the labor cost of workers can be reduced as well as the dangerous wrinkle smoothing work can be reduced.

In the cloth spreading apparatus of the present invention, the wrinkle smoothing unit may further have a controller that controls, independently of each other, a moving speed at which the wrinkle smoothing clamp moving mechanism moves the pair of wrinkle smoothing clamps upward and a moving speed at which the wrinkle smoothing clamp moving mechanism moves the pair of wrinkle smoothing clamps apart from each other in the right-left direction. Alternatively, the wrinkle smoothing unit may have a controller that controls these moving speeds in relation to each other. If the wrinkle smoothing unit has such a controller that controls, in relation to each other, the moving speed at which the wrinkle smoothing clamp moving mechanism moves the pair of wrinkle smoothing clamps upward and the moving speed at which the wrinkle smoothing clamp moving mechanism moves the pair of wrinkle smoothing clamps apart from each other in the right-left direction, it is possible to move the pair of wrinkle smoothing clamps upward and at the same time apart from each other in synchronization with a speed at which the conveyor belt pulls up the remainder of the cloth, so as to smooth out wrinkles without applying a vertical tensile force from the wrinkle smoothing clamps to the remainder of the cloth. Moreover, it is possible to move the pair of wrinkle smoothing clamps upward and at the same time apart from each other at a speed a little lower than the speed at which the conveyor belt pulls up the remainder of the cloth, so as to smooth out wrinkles while spreading the remainder of the cloth also in a vertical direction by applying a vertical tensile force from the wrinkle smoothing clamps to the remainder of the cloth.

In the cloth spreading apparatus of the present invention, the wrinkle smoothing clamp moving mechanism may have a driving mechanism for each of moving the pair of wrinkle smoothing clamps upward and moving the pair of wrinkle smoothing clamps apart from each other in the right-left direction. Alternatively, of the upward motion and the motion apart from each other in the right-left direction of the pair of wrinkle smoothing clamps, at least the upward motion may be driven by a force with which the conveyor belt pulls up the remainder of the cloth and which is obtained from the pair of wrinkle smoothing clamps. If the force with which the conveyor belt pulls up the remainder of the cloth is used to drive the pair of wrinkle smoothing clamps, the number of driving mechanisms for the wrinkle smoothing clamps can be reduced or the driving mechanisms can be omitted, which allows an inexpensive configuration of the wrinkle smoothing clamp moving mechanism. Here, if both of the upward motion and the motion apart from each other in the right-left direction of the pair of wrinkle smoothing clamps are driven by a force with which the conveyor belt pulls up the remainder of the cloth and which is obtained from the pair of wrinkle smoothing clamps, all it takes is, for example, to guide obliquely upward and downward motions of the pair of wrinkle smoothing clamps by a guide mechanism that extends in obliquely upward and downward directions, and to define the movable range by a stopper according to the size of the cloth. This allows an extremely inexpensive configuration of the wrinkle smoothing clamp moving mechanism.

In the cloth spreading apparatus of the present invention, the pair of wrinkle smoothing clamps may firmly clamp the right and left side portions of the cloth. Alternatively, the pair of wrinkle smoothing clamps may clamp the right and left side portions of the cloth loosely enough for the cloth to slide, and catch seams between front and back pieces of the cloth at edges of the right and left side portions. If the pair of wrinkle smoothing clamps thus respectively clamp the right and left side portions of the cloth loosely enough for the cloth to slide, and catch the seams between the front and back pieces of the cloth at the edges of the right and left side portions, as wrinkles in one of the front and back pieces of the cloth are smoothed out by the wrinkle smoothing clamps moving apart from each other in the right-left direction, portions of the other one of the front and back pieces that remain inside the wrinkle smoothing clamps due to the wrinkle smoothing clamps catching the seams between the front and back pieces are pulled out of the wrinkle smoothing clamps. Thus, wrinkles can be smoothed out without an excessive tensile force being applied to the cloth.

DESCRIPTION OF EMBODIMENTS

Figure 1A:
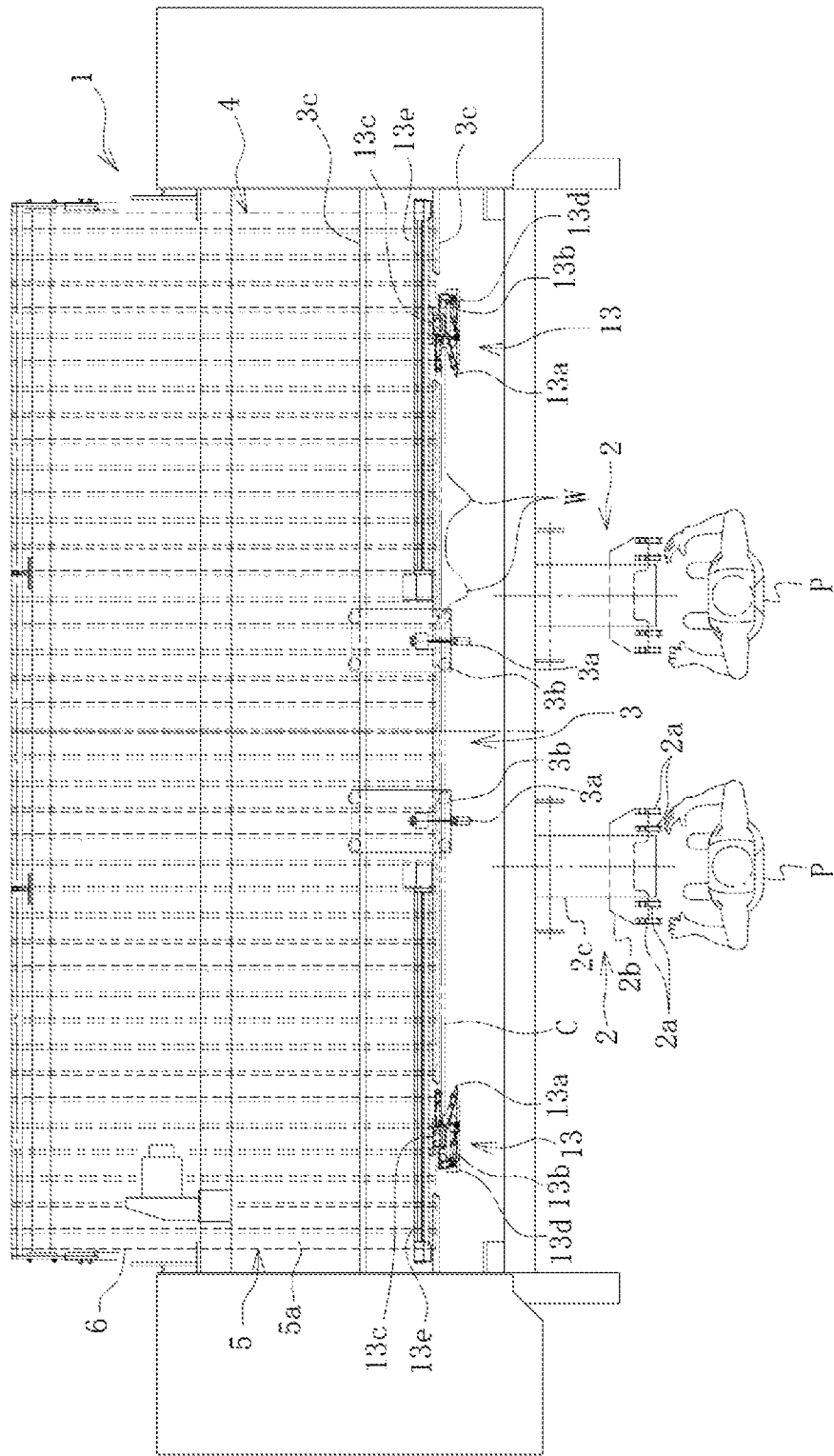
FIG. 1A is a plane see-through plan view showing the configuration of one embodiment of a cloth spreading apparatus of the present invention.
Figure 1B:
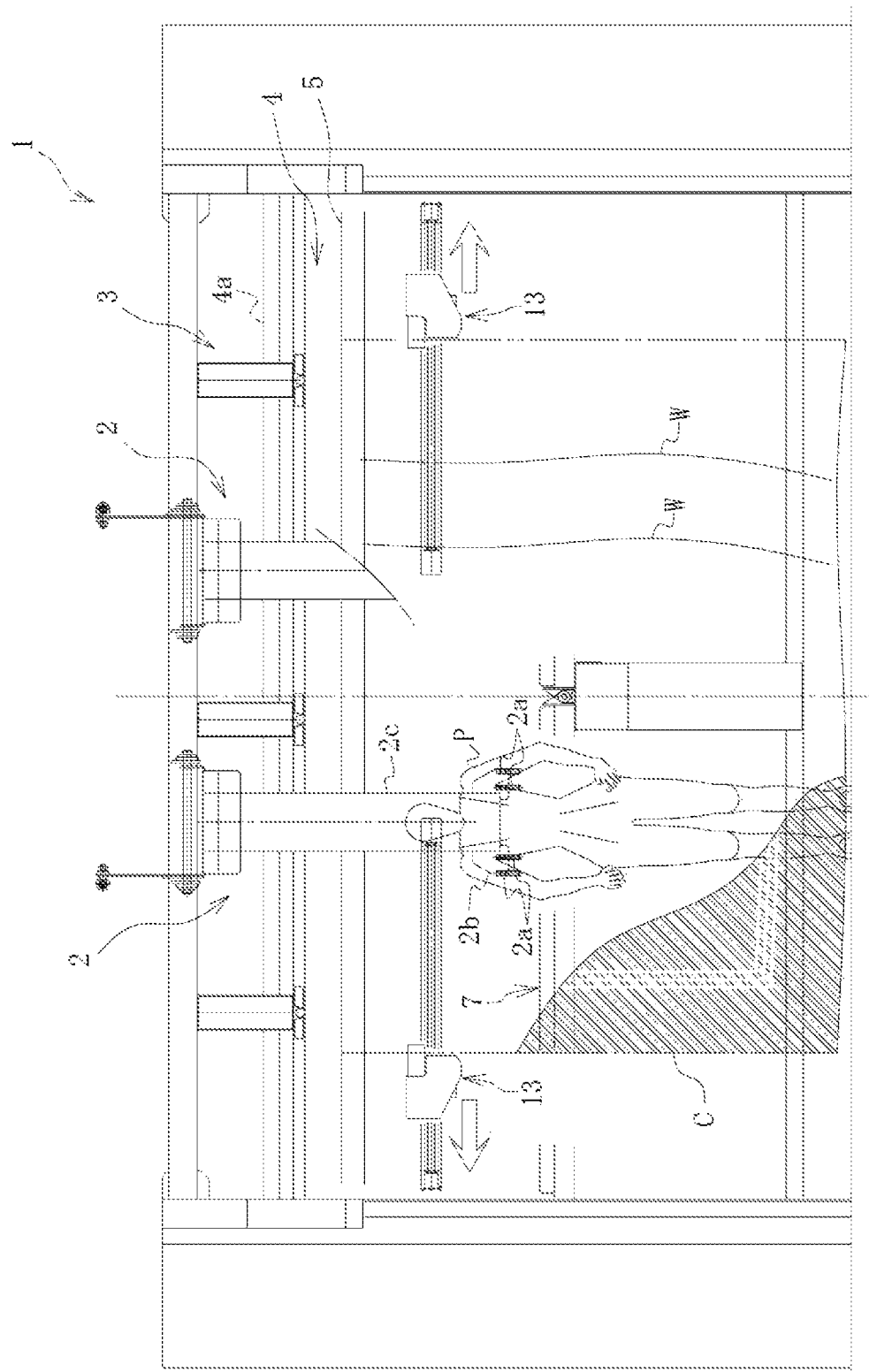
FIG. 1B is a see-through front view showing the configuration of the cloth spreading apparatus of the embodiment.
Figure 1C:
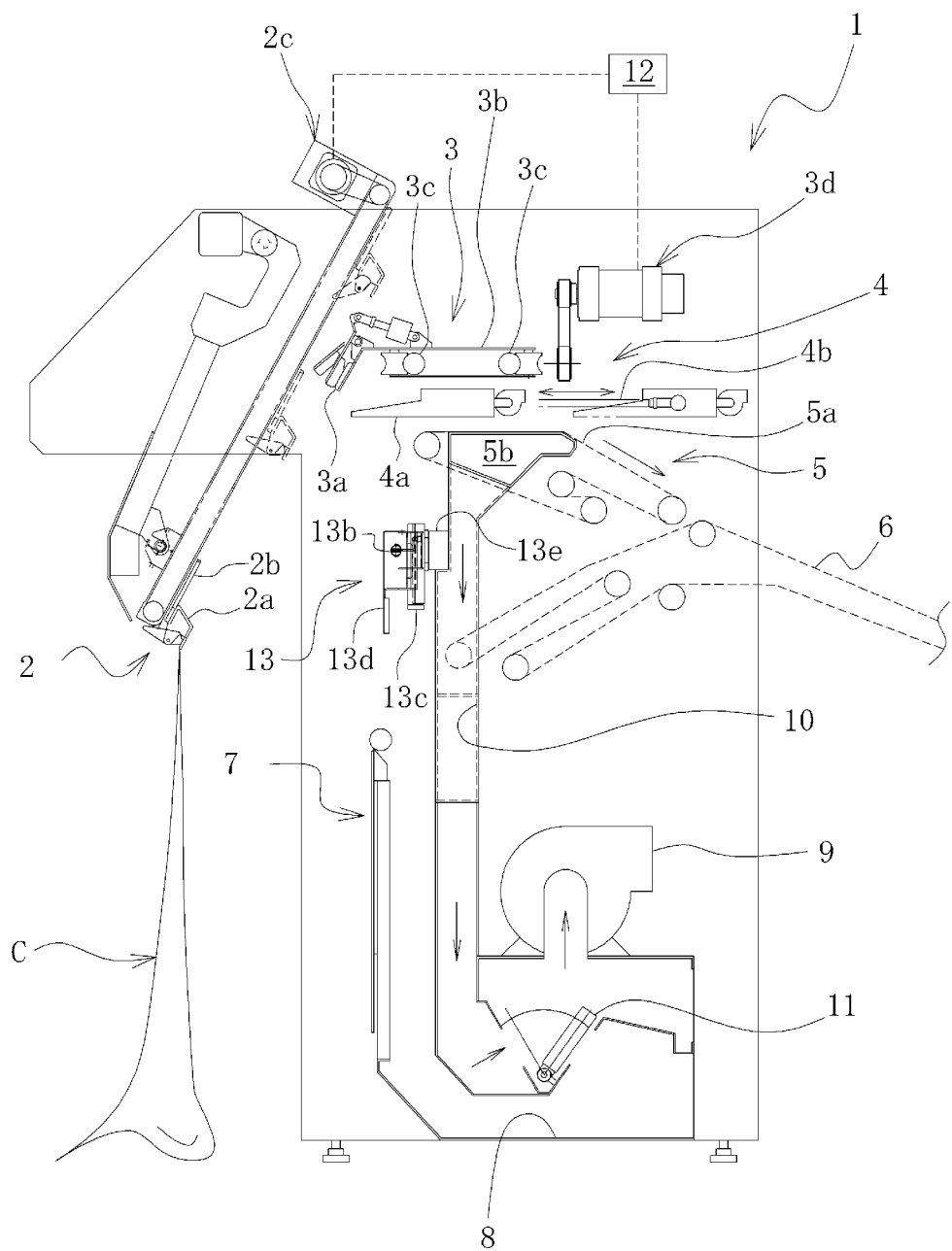
FIG. 1C is a see-through side view showing the configuration of the cloth spreading apparatus of the embodiment.
Figure 2A:
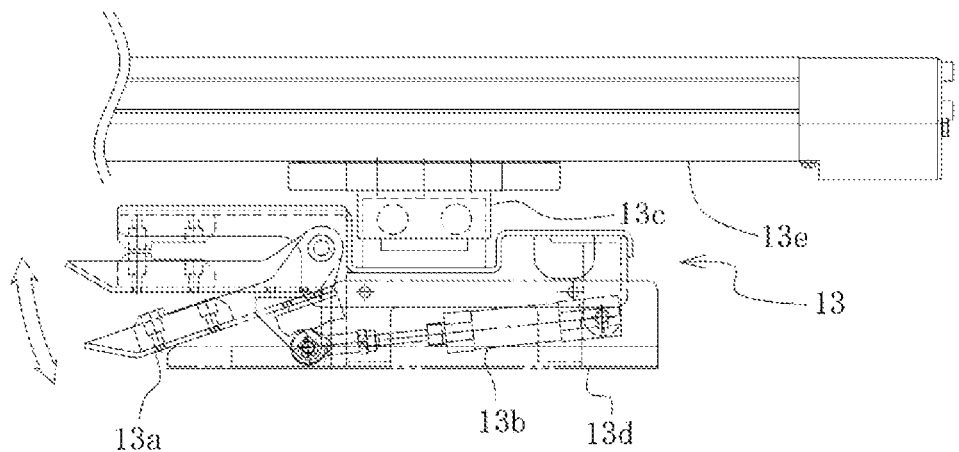
FIG. 2(a) and FIG. 2(b) are a see-through plane view and a see-through front view, respectively, showing the configuration of wrinkle smoothing clamps and a wrinkle smoothing clamp moving mechanism of the cloth spreading apparatus of the embodiment.
Figure 2B:
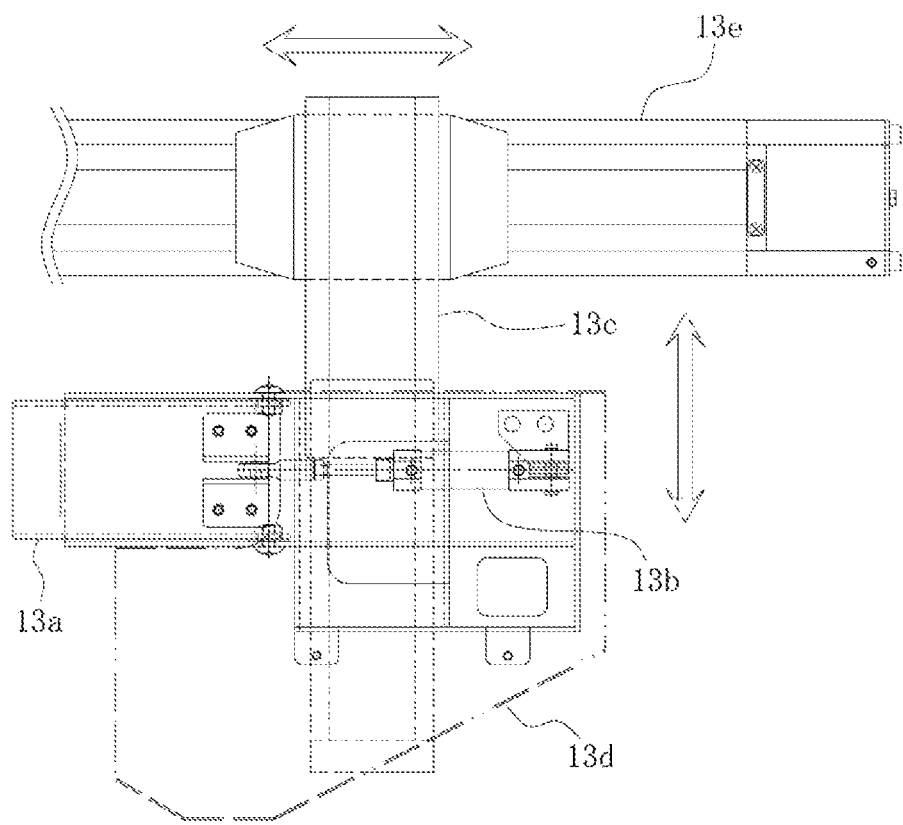
Figure 3A:
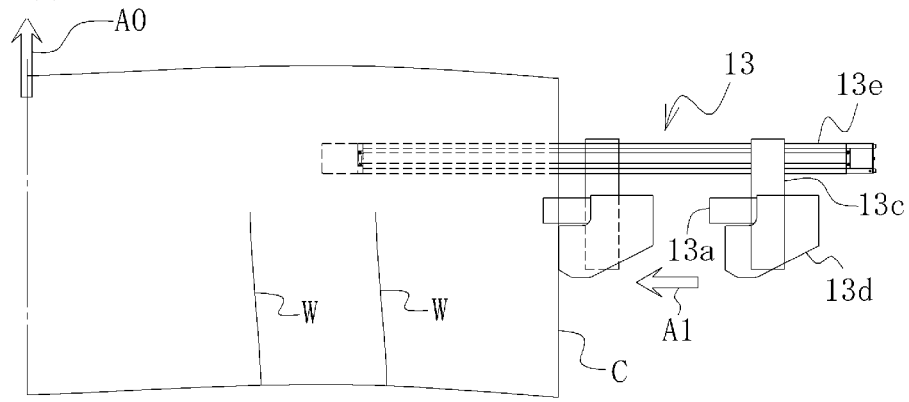
FIG. 3(a), FIG. 3(b), and FIG. 3(c) are diagrams sequentially illustrating actions of the wrinkle smoothing clamps and the wrinkle smoothing clamp moving mechanism of the cloth spreading apparatus of the embodiment.
Figure 3B:
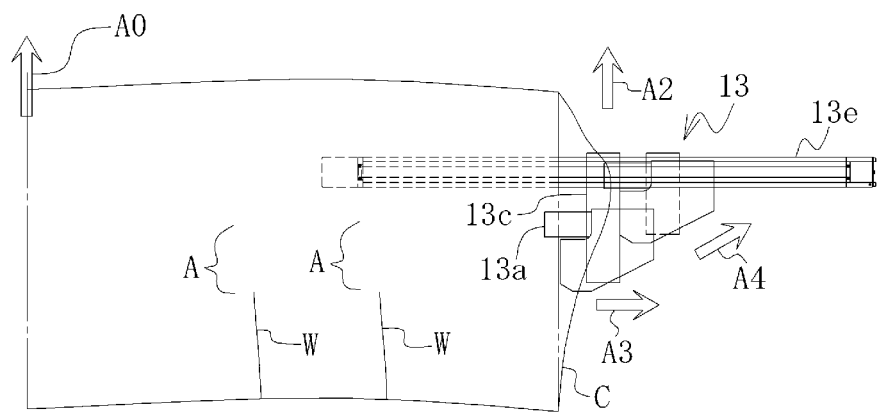
Figure 3C:
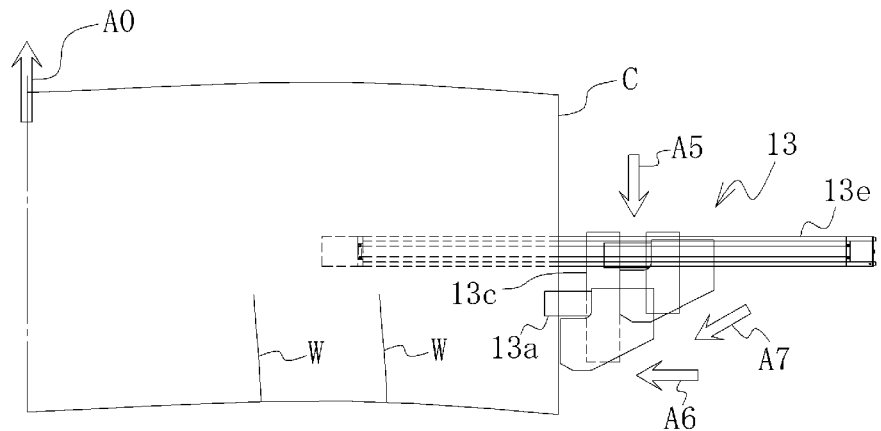

An embodiment of the present invention will be described below in detail based on the drawings. Here, FIG. 1A, FIG. 1B, and FIG. 1C are see-through plan view, front view, and side view, respectively, showing the configuration of one embodiment of a cloth spreading apparatus of the present invention. FIG. 2(a) and FIG. 2(b) are a see-through plan view and a see-through front view showing the configuration of wrinkle smoothing clamps and a wrinkle smoothing clamp moving mechanism of the cloth spreading apparatus of the embodiment, respectively. FIG. 3(a), FIG. 3(b), and FIG. 3(c) are diagrams sequentially illustrating actions of the wrinkle smoothing clamps and the wrinkle smoothing clamp moving mechanism of the cloth spreading apparatus of the embodiment. Reference signs 1, 2, 3, and 4 in the drawings denote an apparatus main body of the cloth spreading apparatus, a cloth feeding unit, a spreading unit that spreads cloth in a right-left direction, and an ejection unit that ejects the spread cloth, respectively.

Like the conventional cloth spreading apparatus described above, the cloth spreading apparatus of this embodiment is also used in a cloth washing factory or the like to spread, one by one, washed pieces of cloth to make the cloth ready to be fed into an iron roller. A plurality of feeding units 2 is provided at a front side of the apparatus main body 1, in a row in the right-left direction. Each feeding unit 2 has: two sets of two feeding clamps 2a making a pair that grasp corners at both ends of a predetermined side, such as a long side, as adjacent corners of a piece of cloth C; a clamp base 2b to which the four feeding clamps 2a are fixed, with each set of two clamps side by side in the right-left direction; and a raising-lowering device 2c that moves the clamp base 2b upward and downward. The raising-lowering device 2c has a driving mechanism that drives, by a servomotor, a step motor, or the like, an endless timing belt that extends, for example, in obliquely upward and downward directions and is coupled to the clamp base 2b, and a guide mechanism that extends in obliquely upward and downward directions along the extension direction of the timing belt and guides upward and downward motions of the clamp base 2b. By driving the clamp base 2b to move upward and downward by the driving mechanism while guiding the clamp base 2b by the guide mechanism, the raising-lowering device 2c can move the pair of feeding clamps 2a upward and downward between a feeding position, indicated by the solid line in FIG. 1A, FIG. 1B, and FIG. 1C, that is set substantially at the level of the chest of a worker P so as to reduce work burden on the worker, and a hand-over position that is set at a higher level than the feeding position such that a lower side portion of cloth does not trail on the floor during spreading. Instead of a servomotor, a step motor, or the like, an actuator such as an air cylinder or a linear motor may be used to form the driving mechanism.

The spreading unit 3 is provided at an upper part of the apparatus main body 1. The spreading unit 3 has: a pair of spreading clamps 3a that are opened and closed by an air cylinder and grasp the corners at both ends of the one side of the cloth C; a pair of carriages 3b to which the spreading clamps 3a are respectively fixed; rails 3c that extend in the right-left direction at an upper part of the apparatus main body 1 and guide a horizontal motion of the carriages 3b in the right-left direction; and a lateral moving device 3d that can separately move the carriages 3b. The lateral moving device 3d is formed, for example, by a combination of an endless timing belt that extends along the rails 3c and a servomotor, a step motor, or the like that drives this timing belt. By driving the carriages 3b through the timing belt by a servomotor, a step motor, or the like while guiding the carriages 3b by the rails 3c, the pair of spreading clamps 3a can be moved independently of or in conjunction with each other in the right-left direction, then receive the corners at both ends of the one side that is an upper side portion of the cloth C from the pair of feeding clamps 2a, grasp these corners, and pull these corners in the right-left direction to thereby spread the cloth C. Instead of a servomotor, a step motor, or the like, another actuator capable of speed and position control may be used as the lateral moving device 3d to drive the carriages 3b.

The ejection unit 4 is disposed under the spreading unit 3. The ejection unit 4 has a catch base 4a as an intermediate moving body that retains by suction the upper side portion of the cloth C using an action of a negative pressure introduced into the catch base 4a, and an air cylinder 4b that moves the catch base 4a forward and backward. The ejection unit 4 further has a primary conveyor 5 as a conveyor belt that is provided under the catch base 4a, and a secondary conveyor 6 also as a conveyor belt that is provided rearward of the primary conveyor 5. Here, each of the primary conveyor 5 and the secondary conveyor 6 is composed of a large number of endless conveyor belts that extend in a front-rear direction and are arrayed in the right-left direction.

The catch base 4a receives, at a forward position, the upper side portion of the cloth C spread in the right-left direction from the spreading clamps 3a, and moves backward while retaining the upper side portion on an upper surface having a large number of small holes by suction using a negative pressure. As the negative pressure is stopped during the backward motion, the catch base 4a releases the upper side portion of the cloth C, and thereby transfers the upper side portion of the cloth C onto the primary conveyor 5. The primary conveyor 5 has a conveyor belt 5a having a large number of small holes, and a vacuum box 5b disposed below a transfer surface of the conveyor belt 5a. The conveyor belt 5a can receive the upper side portion of the cloth C, pull the upper side portion rearward while retaining the upper side portion by suction using a negative pressure from the vacuum box 5*b*, sequentially pull up also the remainder of the cloth C from a middle portion to a lower side portion, and deliver the entire cloth C rearward. The secondary conveyor 6 can eject the cloth C rearward and feed the cloth C into an iron roller in the next process.

A vertical spreading unit 7 in the form of a passage that extends in a vertical direction and is open at an upper end is provided at a lower front part of the apparatus main body 1. A lower part of the vertical spreading unit 7 is connected to a blower 9 through a duct 8. A second duct 10 is formed behind the vertical spreading unit 7, and the second duct 10 is configured to allow communication between the vacuum box 5*b* of the primary conveyor 5 and the blower 9. An opening-closing plate 11 is disposed between the ducts 8, 10 and the blower 9. The opening-closing plate 11 can selectively open or close an opening of the duct 8 and an opening of the duct 10 to thereby switch between a state where air is suctioned from the front side of the apparatus main body 1 into the vertical spreading unit 7 and a state where the vacuum box 5*b* of the primary conveyor 5 is activated.

The cloth spreading apparatus of this embodiment further includes a controller 12. The controller 12 includes an ordinary computer having a central processing unit (CPU), a memory, and others. Based on a given program, the controller 12 controls actions of the raising-lowering device 2*c* and the lateral moving device 3*d*, opening and closing of the spreading clamps 3*a*, forward and backward motions of the catch base 4*a*, generation and removal of a negative pressure inside the catch base 4*a*, actions of the blower 9 and the opening-closing plate 11, and actions of the primary conveyor 5 and the secondary conveyor 6. The controller 12 can control actions of the raising-lowering device 2*c* and the lateral moving device 3*d* so as to move the feeding clamps 2*a* and the spreading clamps 3*a* in synchronization with each other to perform the action of handing over the corners at both ends of the one side that is the upper side portion of the cloth C.

In the cloth spreading apparatus of this embodiment, when the worker P at one of the feeding units 2 picks up adjacent corners of a washed piece of cloth C and has the corners respectively grasped by the pair of feeding clamps 2*a* at the feeding position, the raising-lowering device 2*c* of the feeding unit 2 moves the pair of feeding clamps 2*a* upward to the hand-over position. Meanwhile, the pair of spreading clamps 3*a* have already moved to and been waiting at the hand-over position of the feeding unit. Each set of two feeding clamps 2*a*, while passing by either side of the corresponding spreading clamp 3*a* at the hand-over position, is opened by an action of a cam and hands over the corner of the cloth C to the spreading clamp 3*a*. At the same time, the spreading clamps 3*a* are closed to receive and grasp the corners of the cloth C. The lateral moving device 3*d* laterally moves the pair of spreading clamps 3*a* in a separating direction, so that the pair of spreading clamps 3*a* spread at least the upper side portion of the cloth C in the right-left direction. The catch base 4*a* receives, at the forward position, the upper side portion of the cloth C having been spread in the right-left direction from the spreading clamps 3*a*, and moves backward while retaining the upper side portion. Alternatively, to laterally move the pair of spreading clamps 3*a* in the separating direction, one of the pair of spreading clamps 3*a* may be fixed and only the other spreading clamp 3*a* may be laterally moved in the direction of separating from the one spreading clamp 3*a*.

Then, the conveyor belt 5*a* of the primary conveyor 5 receives thereon the upper side portion of the cloth C having been released from the catch base 4*a* during the backward motion, pulls the upper side portion rearward while retaining the upper side portion by suction using a negative pressure inside the vacuum box 5*b*, sequentially pulls up also the remainder of the cloth C from the middle portion to the lower side portion, and delivers the entire cloth C rearward. While the primary conveyor 5 is pulling up the remainder of the cloth C, the vertical spreading unit 7 pulls the remainder of the cloth C from the upper end of the vertical spreading unit 7 to the inside by a negative pressure, and spreads the cloth C also in the vertical direction. Thereafter, the secondary conveyor 6 receives the cloth C from the primary conveyor 5 and ejects the cloth C rearward, to feed the cloth C into the iron roller (not shown) in the next process.

As shown in FIGS. 1A to 1C and FIGS. 2(*a*) and 2(*b*), the cloth spreading apparatus of this embodiment further includes a wrinkle smoothing unit 13 at a vertically central part of the front side of the apparatus main body 1, at a position between a front end of the primary conveyor 5 and the upper end of the vertical spreading unit 7. The wrinkle smoothing unit 13 has: a pair of wrinkle smoothing clamps 13*a* that respectively clamp right and left side portions of the remainder, from the middle portion to the lower side portion, of the cloth C hanging down from the front end of the primary conveyor 5; an air cylinder 13*b* that opens and closes each wrinkle smoothing clamp 13*a*; a pair of wrinkle smoothing clamp raising-lowering mechanisms 13*c* each formed, for example, by an air-cylinder-driven linear actuator, that constitute a wrinkle smoothing clamp moving mechanism and move upward and downward the pair of wrinkle smoothing clamps 13*a* along with the air cylinders 13*b* in the vertical direction as indicated by the arrow; a cover 13*d* that is fixed to a raising-lowering part of each wrinkle smoothing clamp raising-lowering mechanism 13*c* so as to cover a base portion of the wrinkle smoothing clamp 13*a*, the air cylinder 13*b*, and the raising-lowering part of the wrinkle smoothing clamp raising-lowering mechanism 13*c*; and wrinkle smoothing clamp lateral moving mechanisms 13*e* each formed, for example, by a motor-driven belt linear actuator and fixed to the apparatus main body 1, that also constitute the wrinkle smoothing clamp moving mechanism and horizontally move the pair of wrinkle smoothing clamps 13*a* and the air cylinders 13*b* along with the wrinkle smoothing clamp raising-lowering mechanisms 13*c* and the covers 13*d* in the right-left direction of the apparatus main body 1 as indicated by the arrow. Actions of the air cylinders 13*b*, the wrinkle smoothing clamp raising-lowering mechanisms 13*c*, and the wrinkle smoothing clamp lateral moving mechanisms 13*e* are also controlled by the controller 12. Instead of the air cylinder 13*b*, another actuator such as an electromagnetic solenoid may be used. A linear motor may be used as the linear actuator of the wrinkle smoothing clamp raising-lowering mechanisms 13*c* and the wrinkle smoothing clamp lateral moving mechanisms 13*e*.

In the wrinkle smoothing unit 13, while the primary conveyor 5 is receiving the upper side portion of the cloth C from the catch base 4*a* and sequentially pulling up the remainder of the cloth C from the middle portion to the lower side portion, and at the same time the vertical spreading unit 7 is pulling the remainder of the cloth C to the inside by a negative pressure and spreading the cloth C also in the vertical direction, the pair of wrinkle smoothing clamps 13*a* respectively clamp, by actions of the air cylinders 13*b*, the right and left side portions of the remainder from the middle portion to the lower side portion, which is hanging down from the front end of the primary conveyor 5 and of which the lower side portion is being pulled into the vertical spreading unit 7, of the cloth C being pulled up by the primary conveyor 5. In this clamping state, the pair of wrinkle smoothing clamps 13a are moved apart from each other, as indicated by the arrows in FIG. 1B, by actions of the wrinkle smoothing clamp raising-lowering mechanisms 13c and the wrinkle smoothing clamp lateral moving mechanisms 13e, so that the middle portion of the cloth C is pulled in the right-left direction and wrinkles W in the part from the middle portion to the lower side portion are smoothed out.

Specifically, in the wrinkle smoothing unit 13, first, as shown in FIG. 3(a), while the primary conveyor 5 is pulling up the remainder of the cloth C from the middle portion to the lower side portion as indicated by arrow A0, first, the wrinkle smoothing clamp raising-lowering mechanism 13c moves downward the wrinkle smoothing clamp 13a having been opened by an action of the air cylinder 13b, and then the wrinkle smoothing clamp lateral moving mechanism 13e horizontally moves the wrinkle smoothing clamp 13a toward the right or left end portion of the remainder of the cloth C as indicated by arrow A1. Then, when a sensor (not shown), such as an optical sensor, attached to the wrinkle smoothing clamp 13a detects the right or left end portion of the remainder of the cloth C, the wrinkle smoothing clamp 13a is closed by an action of the air cylinder 13b to clamp the right or left end portion of the remainder of the cloth C. Then, as shown in FIG. 3(b), the wrinkle smoothing clamp raising-lowering mechanism 13c moves the wrinkle smoothing clamp 13a upward as indicated by arrow A2, and at the same time, the wrinkle smoothing clamp lateral moving mechanism 13e horizontally moves the wrinkle smoothing clamp 13a in a direction away from the center of the apparatus as indicated by arrow A3. Thus, as the remainder of the cloth C moves upward, the wrinkle smoothing clamp 13a moves obliquely upward as indicated by arrow A4 and spreads the remainder of the cloth C in the right-left direction to thereby spread at least parts of the cloth C at upper portions of the wrinkles W.

Thereafter, as shown in FIG. 3(c), while the primary conveyor 5 is continuously pulling up the remainder of the cloth C from the middle portion to the lower side portion as indicated by arrow A0, the wrinkle smoothing clamp 13a is opened by an action of the air cylinder 13b to temporarily release the right or left end portion of the remainder of the cloth C. Then, the wrinkle smoothing clamp raising-lowering mechanism 13c moves the wrinkle smoothing clamp 13a downward as indicated by arrow A5, and at the same time, the wrinkle smoothing clamp lateral moving mechanism 13e horizontally moves the wrinkle smoothing clamp 13a toward the right or left end portion of the remainder of the cloth C as indicated by arrow A6. Thus, the wrinkle smoothing clamp 13a moves obliquely downward as indicated by arrow A7. Then, the wrinkle smoothing clamp 13a is closed by an action of the air cylinder 13b to clamp the right or left end portion of the remainder of the cloth C, at a position a little lower than the position at which the end portion was clamped earlier. Thereafter, the actions shown in FIGS. 3(b) and 3(c) are repeated until a portion of the cloth C near the lower side portion is reached, to thereby sequentially spread the cloth C down to lower ends of the wrinkles W and smooth out these wrinkles.

Since the wrinkle smoothing clamps 13a thus firmly clamp the right and left side portions of the remainder of the cloth C from the middle portion to the lower side portion and spread the remainder in the right-left direction, the cloth spreading apparatus of this embodiment can spread the remainder of the cloth C enough to smooth out every wrinkle regardless of the state of the cloth C or the type of the cloth, without requiring a dedicated assistant worker for wrinkle smoothing work. Therefore, the labor cost of workers can be reduced as well as the dangerous wrinkle smoothing work can be reduced.

When smoothing out wrinkles, it is possible to move the pair of wrinkle smoothing clamps 13a upward and at the same time apart from each other in synchronization with a speed at which the primary conveyor 5 pulls up the remainder of the cloth C, to thereby smooth out wrinkles without applying a vertical tensile force from the wrinkle smoothing clamps 13a to the remainder of the cloth C. It is also possible to move the pair of wrinkle smoothing clamps 13a upward and at the same time apart from each other at a speed a little lower than the speed at which the primary conveyor 5 pulls up the remainder of the cloth C, to thereby smooth out wrinkles while spreading the remainder of the cloth C also in the vertical direction by applying a vertical tensile force from the wrinkle smoothing clamps 13a to the remainder of the cloth C.

Figure 4A:
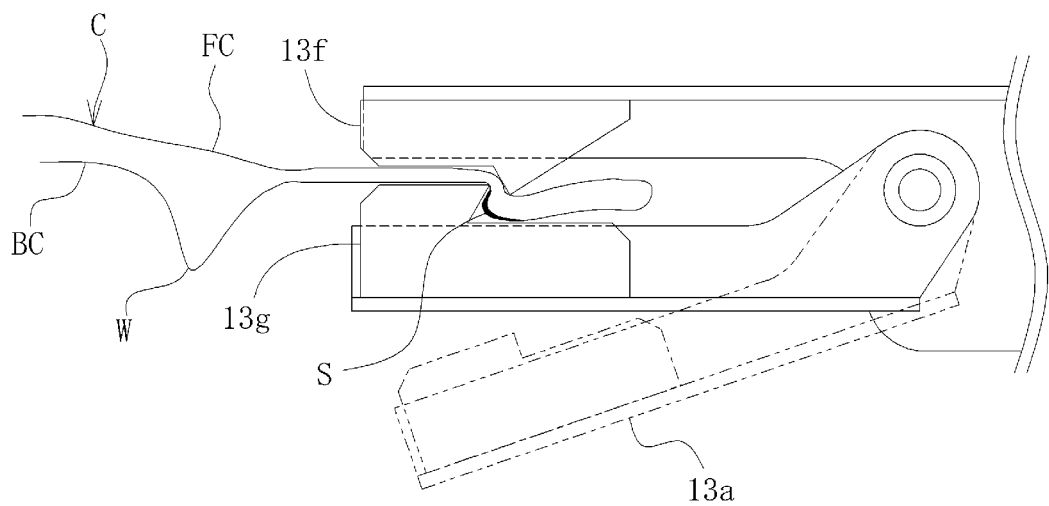
FIG. 4(a) and FIG. 4(b) are diagrams sequentially illustrating actions of a modified example of the wrinkle smoothing clamps of the cloth spreading apparatus of the embodiment.
Figure 4B:
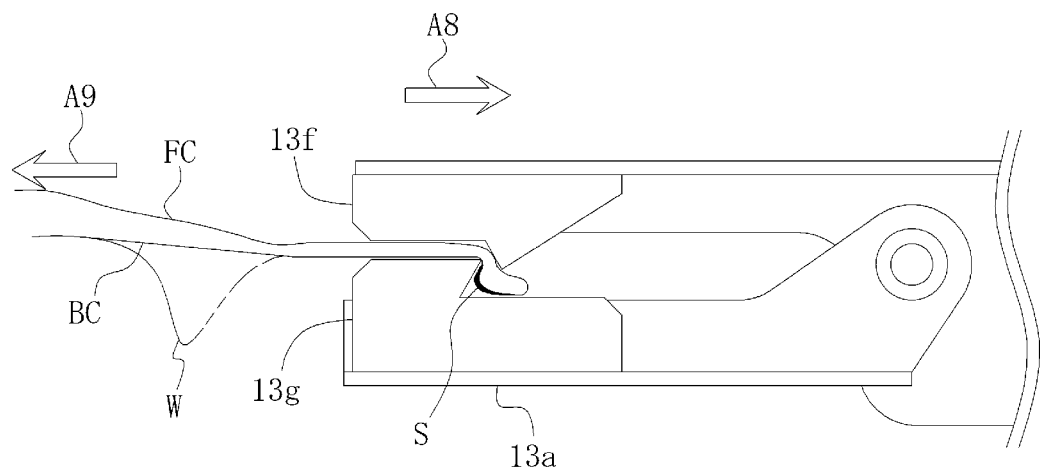
Figure 5A:
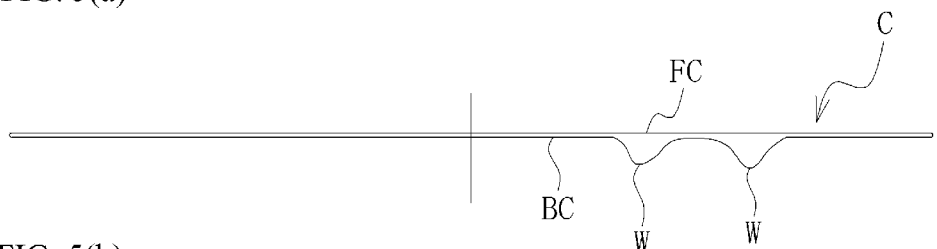
FIG. 5(a) and FIG. 5(b) are a plane view and a front view, respectively, showing an example of wrinkles in a bed linen such as bed sheet or duvet cover as cloth that result from spreading by a cloth spreading apparatus.
Figure 5B:
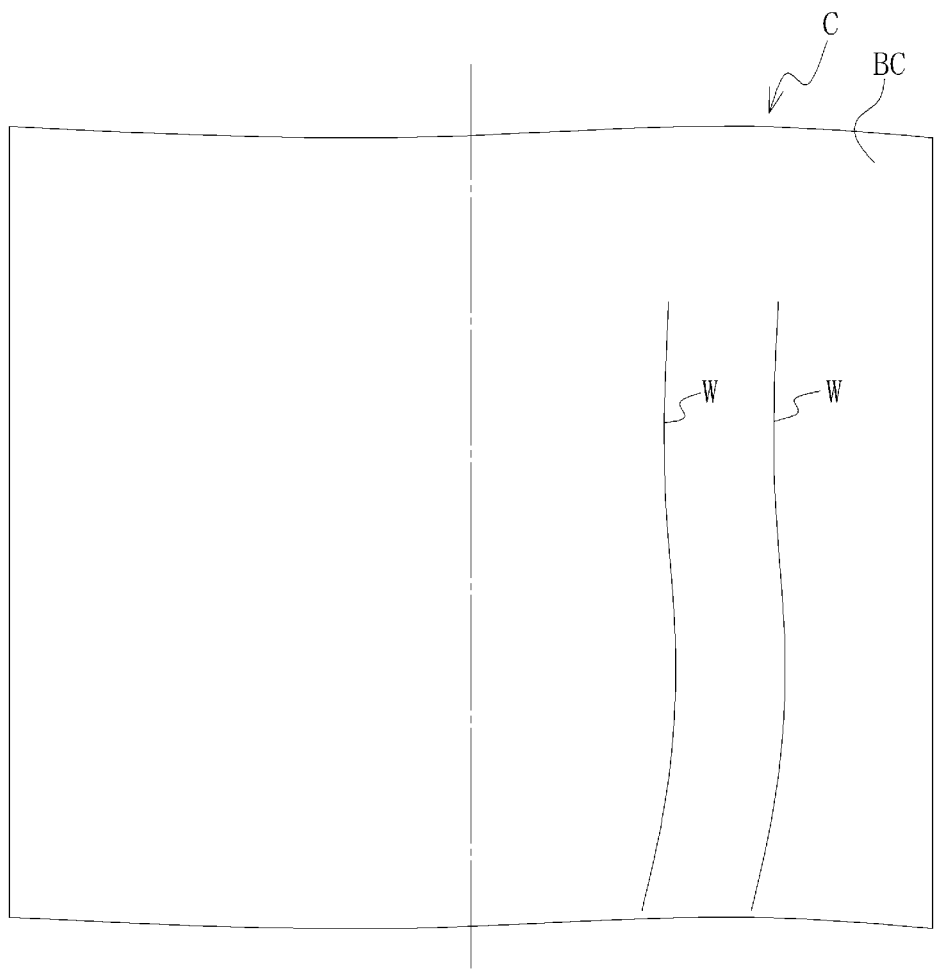

FIGS. 4(a) and 4(b) are diagrams sequentially illustrating actions of a modified example of the wrinkle smoothing clamps of the cloth spreading apparatus of the above embodiment. When closed, the wrinkle smoothing clamps 13a described above firmly clamp right and left end portions of the cloth C such that the cloth C does not slip. The wrinkle smoothing clamps 13a in this modified example each have clamping blocks 13f, 13g provided respectively on a fixed arm that is located on the upper side in the figure and on a swinging arm that is located on the lower side in the Figure. As indicated by the solid lines in FIG. 4(a), when the wrinkle smoothing clamp 13a is closed, a clearance that allows the cloth C to slide is left between the clamping blocks 13f, 13g. In clamping site, the clamping block 13f has an uneven portion that protrudes compared with a portion thereof on a leading-end side, and the clamping block 13g has an uneven portion that is depressed compared with a portion thereof on the leading-end side. When the wrinkle smoothing clamp 13a is closed, a seam S having a larger thickness between front and back pieces of the cloth C at an edge of the right and left side portion is caught by being pressed by the protruding uneven portion into the depressed uneven portion.

Thus, as shown in FIG. 4(b), the wrinkle smoothing clamps 13a in this modified example make it possible to spread the remainder of the cloth C while pulling the front piece FC out of the clearance between the clamping blocks 13f, 13g until the wrinkles W in the back piece BC are smoothed out. It is therefore possible to reliably smooth out wrinkles even when the cloth C is double-layer cloth, for example, a frame-shaped bed linen having a large opening at a central part of the front piece, or an ordinary bed linen having no opening at a central part of the front piece.

While the present invention has been described above based on the shown examples, the invention is not limited to the above-described examples and changes can be appropriately made thereto within the scope of the description of the claims. For example, in the cloth spreading apparatus of the above embodiment, the cloth C is spread in the right-left direction by the spreading unit 3 and the wrinkle smoothing unit 13. Alternatively, the cloth spreading apparatus of the present invention may further have an assisting spreading device, for example, similar to that of the conventional cloth spreading apparatus described in Patent Literature 1, that has two sets of endless belts making a pair that face each other in the front-rear direction and extend in the horizontal direction, respectively hold the right and left side portions of the remainder of the cloth C, of which the upper side portion is being retained and pulled by the primary conveyor 5, between the opposite endless belts loosely enough for the cloth C to slide, so as to allow the primary conveyor 5 to pull up the cloth C, and spread the remainder of the cloth C in the right-left direction. This assisting spreading device may be disposed, for example, immediately above the wrinkle smoothing unit 13 and used in combination with the wrinkle smoothing unit 13.

In the cloth spreading apparatus of the present invention, for example, the wrinkle smoothing clamp raising-lowering mechanisms 13c may be configured to only guide upward and downward motions of the wrinkle smoothing clamps 13a and not to include the driving mechanism, and the wrinkle smoothing clamps 13a may move downward under their own weight. Alternatively, obliquely upward and downward motions of the pair of wrinkle smoothing clamps may be guided, for example, by a pair of guide mechanisms that extend in obliquely upward and downward directions and move farther apart from each other as they move upward, to thereby omit the whole driving mechanism for moving the wrinkle smoothing clamps. In these cases, a stopper that defines a limit position for downward motions of the wrinkle smoothing clamps according to the width of the cloth to be spread may be provided.

Further, in the cloth spreading apparatus of the present invention, the linear moving mechanisms of one or both of the wrinkle smoothing clamp raising-lowering mechanisms 13c and the wrinkle smoothing clamp lateral moving mechanisms 13e may be substituted with pivoting mechanisms that drive, for example, by a servomotor or a step motor. Alternatively, both of the wrinkle smoothing clamp raising-lowering mechanisms 13c and the wrinkle smoothing clamp lateral moving mechanisms 13e may be substituted with a single pivoting mechanism, for example, configured as described above, that performs an action combining actions of the wrinkle smoothing clamp raising-lowering mechanism 13c and the wrinkle smoothing clamp lateral moving mechanism 13e, or an action similar to that combined action, and the wrinkle smoothing clamp may be pivoted and moved by this pivoting mechanism. In this case, for example, a parallel link or the like may be combined with the pivoting mechanism to keep the wrinkle smoothing clamp during pivoting and moving oriented toward the right and left side portion of the cloth C.

The cloth spreading apparatus of the present invention is not limited to an apparatus in which a plurality of feeding units 2 is provided at the front side of the apparatus main body 1, in a row in the right-left direction, like the apparatus in the above embodiment or that described in Patent Literature 1. The cloth spreading apparatus of the present invention may be an apparatus in which, for example, as in the cloth spreading apparatus disclosed earlier by the present applicants in Japanese Patent Laid-Open No. 2011-036312, a feeding unit is provided at each side of an apparatus main body; a preliminary spreading mechanism is provided at an upper part of the apparatus main body; each feeding unit supplies a piece of cloth having been fed by a worker to the preliminary spreading mechanism at the upper part of the apparatus main body; and the preliminary spreading mechanism spreads the cloth to some extent and hands over an upper side portion of the cloth to a pair of spreading chucks of a spreading unit. The cloth C to which the cloth spreading apparatus of the present invention is applied is not limited to the above-described relatively large double-layer cloth such as a frame-shaped bed linen having a large opening at a central part of the front piece or an ordinary bed linen having no opening at a central part of the front piece. The cloth C may also be relatively small double-layer cloth such as a pillowcase (pillow cover), or single-layer cloth such as a towel, sheet, or tablecloth. The cloth spreading apparatus of the present invention can reliably smooth out wrinkles in also such pieces of cloth.

INDUSTRIAL APPLICABILITY

As has been described above, since the wrinkle smoothing clamps reliably clamp right and left side portions of the remainder of a piece of cloth from a middle portion to a lower side portion and spread the remainder of the cloth in the right-left direction, the cloth spreading apparatus of the present invention can spread the remainder of the cloth enough to smooth out every wrinkle regardless of the state of the cloth or the type of the cloth, without requiring a dedicated assistant worker for wrinkle smoothing work. Therefore, the labor cost of workers can be reduced as well as the dangerous wrinkle smoothing work can be reduced.

REFERENCE SIGNS LIST

1 Apparatus main body
2 Feeding unit
2a Feeding clamp
2b Clamp base
2c Raising-lowering device
3 Spreading unit
3a Spreading clamp
3b Carriage
3c Rail
3d Lateral moving device
4 Ejection unit
4a Catch base
4b Air cylinder
5 Primary conveyor
5a Conveyor belt
5b Vacuum box
6 Secondary conveyor
7 Vertical spreading unit
8, 10 Duct
9 Blower
11 Opening-closing plate
12 Controller
13 Wrinkle smoothing unit
13a Wrinkle smoothing clamp
13b Air cylinder
13c Wrinkle smoothing clamp raising-lowering mechanism
13d Cover
13e Wrinkle smoothing clamp lateral moving mechanism
13f, 13g Clamping block
C Cloth
FC Front piece
BC Back piece
S Seam between front and back pieces

The invention claimed is:

1. A cloth spreading apparatus comprising:
a spreading unit having a pair of spreading clamps that grasp adjacent corners of a fed piece of cloth and spread at least an upper side portion between these corners in a right-left direction; and
an ejection unit having a conveyor belt that receives the spread upper side portion of the cloth, pulls the upper side portion rearward, sequentially pulls up also the remainder of the cloth from a middle portion to a lower side portion, and ejects the entire cloth rearward,
the cloth spreading apparatus being characterized by:

the cloth spreading apparatus further comprises a wrinkle smoothing unit that smooths out wrinkles in the remainder of the cloth from the middle portion to the lower side portion while the conveyor belt is pulling up the remainder of the cloth; and the wrinkle smoothing unit has:

a pair of wrinkle smoothing clamps that respectively clamp right and left side portions of the remainder of the cloth being pulled up by the conveyor belt; and a wrinkle smoothing clamp moving mechanism that moves the pair of wrinkle smoothing clamps upward and at the same time apart from each other in the right-left direction as the remainder of the cloth is pulled up by the conveyor belt.

2. The cloth spreading apparatus according to claim 1, wherein the wrinkle smoothing unit further has a controller that controls, in relation to each other, a moving speed at which the wrinkle smoothing clamp moving mechanism moves the pair of wrinkle smoothing clamps upward and a moving speed at which the wrinkle smoothing clamp moving mechanism moves the pair of wrinkle smoothing clamps apart from each other in the right-left direction.

3. The cloth spreading apparatus according to claim 2, wherein, of an upward motion and a motion apart from each other in the right-left direction of the pair of wrinkle smoothing clamps, at least the upward motion is driven by a force with which the conveyor belt pulls up the remainder of the cloth and which is obtained from the pair of wrinkle smoothing clamps.

4. The cloth spreading apparatus according to claim 3, wherein the pair of wrinkle smoothing clamps respectively clamp right and left side portions of the cloth loosely enough for the cloth to slide, and catch seams between front and back pieces of the cloth at edges of the right and left side portions.

5. The cloth spreading apparatus according to claim 2, wherein the pair of wrinkle smoothing clamps respectively clamp right and left side portions of the cloth loosely enough for the cloth to slide, and catch seams between front and back pieces of the cloth at edges of the right and left side portions.

6. The cloth spreading apparatus according to claim 1, wherein, of an upward motion and a motion apart from each other in the right-left direction of the pair of wrinkle smoothing clamps, at least the upward motion is driven by a force with which the conveyor belt pulls up the remainder of the cloth and which is obtained from the pair of wrinkle smoothing clamps.

7. The cloth spreading apparatus according to claim 6, wherein the pair of wrinkle smoothing clamps respectively clamp right and left side portions of the cloth loosely enough for the cloth to slide, and catch seams between front and back pieces of the cloth at edges of the right and left side portions.

8. The cloth spreading apparatus according claim 1, wherein the pair of wrinkle smoothing clamps respectively clamp right and left side portions of the cloth loosely enough for the cloth to slide, and catch seams between front and back pieces of the cloth at edges of the right and left side portions.

* * * * *